Patented Dec. 1, 1953

2,661,375

UNITED STATES PATENT OFFICE 2,661,375

PRODUCTION OF PHENOLS AND ACYCLIC ALDEHYDES

Joshua C. Conner, Jr., Wilmington, Del., assignor to Hercules Powder Company, Wilmington, Del., a corporation of Delaware No Drawing. Application February 7, 1950, Serial No. 142,943

15 Claims. (Cl. 260—601)

This invention relates to α-alkylarylmethyl hydroperoxides and, more particularly, to a process for the conversion of these hydroperoxides to phenols.

There have been numerous processes developed for the purpose of producing phenols synthetically due to the fact that the demand for phenols, such as the cresols and phenol itself, far exceeds the amount which may be recovered in the refining of coal tar. Only a limited number of the processes for the preparation of phenol have proved sufficiently satisfactory to be applicable to commercial production. One of these involves the sulfonation of benzene and the formation of sodium benzene sulfonate which is fused with sodium hydroxide to produce sodium phenolate. The phenolate upon acidification yields phenol, which may be purified by distillation. However, probably the most widely used commercial process today for the preparation of phenol is that of hydrolyzing chlorobenzene with aqueous sodium hydroxide under conditions of high temperature and pressure to produce sodium phenolate, which then is acidified to give phenol. The chlorobenzene may be prepared either by direct chlorination of benzene or by chlorination with a mixture of hydrogen chloride and oxygen.

Even those processes which have been adapted to commercial production of phenol are not entirely satisfactory. They require large equipment investment and installation to provide facilities for the raw materials used, and they must be operated on the basis of large production capacity in order to produce phenol at a reasonable price. In addition, the processes are disadvantageous because of the many steps involved.

Now in accordance with this invention, it has been found that phenols and aliphatic aldehydes may be prepared simply, efficiently, economically, and simultaneously from α-alkylarylmethyl hydroperoxides by contacting such a hydroperoxide with an aqueous solution of a water-soluble acid, this solution containing at least 20% by weight of the acid. The temperature utilized is between about 15° and about 100° C. The present process is straightforward and is free of many of the disadvantages connected with the other processes discussed. In addition to producing phenols, the process at the same time produces aliphatic aldehydes as valuable products. This also is in contrast to previous processes for preparing phenols.

In carrying out the process in accordance with this invention an α-alkylarylmethyl hydroperoxide such as α-methylbenzyl hydroperoxide is contacted at a temperature of about 95° C., for example, with an aqueous solution of a water-soluble acid, such as sulfuric acid, in which solution the concentration of the acid is at least 20% by weight. The reaction is carried out for a sufficient length of time to decompose the hydroperoxide completely to phenol. Upon completion of the reaction, the reaction mixture is cooled, the aqueous and organic phases are separated and the phenol is recovered from the organic phase by distillation. The aqueous phase may then be used again. In the case of α-methylbenzyl hydroperoxide the other product of the decomposition reaction is acetaldehyde, and it is recovered in suitable condensation units which are part of the apparatus used.

The following examples constitute specific illustrations of the embodiments of the invention generally outlined above. All amounts are based on parts by weight unless otherwise specified.

*Example I*

The hydroperoxide used in this and the following example was prepared by oxidizing ethylbenzene with oxygen at 70–90° C., using t-butyl hydroperoxide as initiator. The oxidation was stopped when the hydroperoxide concentration reached the value of 8.5 g. of hydroperoxide per 100 ml. of reaction mixture. The product was isolated by precipitating with concentrated NaOH and then liberating the hydroperoxide with HCl in the cold. It was taken up in benzene and concentrated by distilling off the solvent under reduced pressure.

Sixty parts of 33% sulfuric acid was heated to reflux in a reaction vessel equipped with a reflux condenser, a gas inlet tube with a fine tip which extended below the surface of the liquid, a high-speed stirrer, a thermometer, and an inlet for the introduction of hydroperoxide. The condenser was connected to a series of traps for recovering the aliphatic aldehyde formed in the reaction. During the cleavage reaction, air was drawn through the apparatus in order to sweep acetaldehyde vapors through the condenser and into the traps, one of which contained an absorbing solution, another being refrigerated. While the refluxing acid was stirred vigorously, 10 parts of α-methylbenzyl hydroperoxide in the form of a mixture containing 20 parts of a hydrocarbon material such as ethylbenzene was added over a period of 9 minutes. After heating for 35 minutes at a temperature of 95°, the mixture was cooled and an analysis of the oil phase showed that 98% of the hydroperoxide had reacted. The acetaldehyde collected in the absorbing solution and the refrigerated trap amounted to 70.4% of the theoretical yield based upon the amount of α-methylbenzyl hydroperoxide originally present. Analysis of the contents of the reaction flask revealed a yield of phenol which was 72% of the theoretical yield based on the amount of α-methylbenzyl hydroperoxide originally present.

*Example II*

Using the same apparatus and the same procedure as described in Example I, 20 parts of α-methylbenzyl hydroperoxide mixed with 2.8 parts of inert hydrocarbon material was added slowly to 75 parts of 40% sulfuric acid while maintaining the temperature at 80–90° C. Essentially complete decomposition of the hydroperoxide had occurred after about 30 minutes. The acetaldehyde amounted to 75% of the theoretical yield based on the amount of α-methylbenzyl hydroperoxide originally present.

In order to recover the phenol, the reaction mixture was made basic by the addition of 35% sodium hydroxide and the alkaline mixture was extracted with ether to remove neutral oils. The alkaline solution was then acidified with hydrochloric acid and the phenol extracted therefrom with benzene. The solvent was removed by distillation and the yield of phenol was found to be 84% of the theoretical yield based on the amount of α-methylbenzyl hydroperoxide originally present.

Although the process of this invention has been set forth in the examples as applied to the hydroperoxide obtained by the oxidation of ethylbenzene, other α-alkylarylmethyl hydroperoxides are also operable. Such hydroperoxides may be prepared by the oxidation of alkyl-substituted aromatic organic compounds having the structural formula R—CH$_2$—Ar in which R represents an alkyl group and Ar represents a substituent selected from the group consisting of aryl and alkaryl groups. The oxidation may be carried out in the liquid phase utilizing air or molecular oxygen as the oxidizing agents. One method of preparing these hydroperoxides involves the liquid phase oxidation of the alkyl-substituted aromatic organic compounds having the above structural formula by passing an oxygen-containing gas through the compounds at a temperature between about 25° C. and about 95° C. under atmospheric pressure in the presence of an aqueous alkali. The reaction proceeds slowly. The concentration of the aqueous alkali may be between about 0.01% and about 35%, although it is preferable to use concentrations of about 0.01% to about 2%. An even more desirable alkali concentration range is between 0.5% and 1%. Vigorous agitation is desirable during the oxidation reaction. A preferred method of preparing the hydroperoxides, however, involves intimately contacting under anhydrous, non-catalytic conditions the alkyl-substituted aromatic organic compound in liquid phase with an oxygen-containing gas, such as air or molecular oxygen, in the presence of a peroxidic-free radical oxidation initiator, such as an α-alkylarylmethyl hydroperoxide. In contrast to the method first discussed, the oxidation is carried out in the absence of an aqueous phase and in such cases the reaction is most desirably carried out in the absence of a catalyst such as ultraviolet light or a heavy metal oxidation catalyst. Aside from the compound being oxidized and the air or molecular oxygen used as oxidizing agent, there may be added to the oxidation reaction mixture a peroxidic oxidation initiator capable of initiating a free radical oxidation chain. Such initiators may be added in small amount to the reaction mixture and are exemplified by the α-alkylarylmethyl hyproperoxides used in the process of the present invention. In general, there may be used as initiator any organic peroxide, hydroperoxide, or compound capable of decomposing to form organic free radicals.

The α-alkylarylmethyl hydroperoxides which may be used in accordance with the process of this invention have the following structural formula

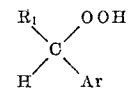

in which R$_1$ represents an alkyl group, Ar represents a substituent selected from the group consisting of aryl and alkaryl groups, and the —OOH group represents a hydroperoxy group. As illustrative of the alkyl-substituted aromatic organic compounds which may be oxidized, ethylbenzene, ethyltoluene, diethylbenzene, ethyl-n-propylbenzene, ethyl-n-butylbenzene, and ethyl-t-butylbenzene may be mentioned. These compounds lead to α-methylbenzyl, α-methyl-p-methylbenzyl, α-methyl-p-ethylbenzyl, α-methyl-p-n-propylbenzyl, α-methyl-p-n-butylbenzyl, and α-methyl-p-t-butylbenzyl hydroperoxides. Also in the case of p-diethylbenzene, ethyl-p-n-propylbenzene, and ethyl-p-n-butylbenzene, there may be obtained α,α-dimethyl-p-xylylene dihydroperoxide, α-methyl-α′-ethyl-p-xylylene dihydroperoxide and α-methyl-α′-n-propyl-p-xylylene dihydroperoxide. These compounds also may be named as aryl(alkyl)methyl hydroperoxides. For example, α-methylbenzyl hydroperoxide may be designated as phenyl(methyl)methyl hydroperoxide. The aryl and alkaryl groups need not be derived from benzene, as is the case in the aforementioned compounds, for compounds containing aromatic nuclei derived from naphthalene, anthracene, phenanthrene, and the like also are operable. The aryl group may be substituted with alkyl groups such as methyl, ethyl, n-propyl, n-butyl, t-butyl, and the like to give alkaryl substituents, the same alkyl groups also being representative of R$_1$ in the structural formula. The oxidation of the alkyl-substituted aromatic organic compounds may be carried out with the compounds themselves if they are liquids or upon solutions of the compounds in suitable solvents if the compounds are solids at the oxidation temperature.

In carrying out the decomposition process of this invention, several different modifications of the α-alkylarylmethyl hydroperoxides may be used. The hydroperoxide may be utilized, for example, either in the form of the pure hydroperoxide or in the form of a crude reaction mixture containing the hydroperoxide and obtained by the oxidation with air or oxygen of the alkyl-substituted aromatic organic compounds having the structural formula shown previously. When the hydroperoxide is obtained by such an oxidation, the oxidation usually is interrupted before all of the hydrocarbon has reacted in order to avoid or limit side reactions. In this manner, the α-alkylarylmethyl hydroperoxide is obtained in mixture with smaller or larger amounts of the original hydrocarbon, which is an α-alkylarylmethane, and the mixture also may contain secondary reaction products such as alcohols, which are usually α-alkylarylmethyl alcohols. The oxidation of ethylbenzene, for example, may lead to a reaction product containing α-methylbenzyl hydroperoxide, α-methylbenzyl alcohol, a small amount of acetophenone, and unchanged ethylbenzene. However, by the preferred method of oxidation described previously, the hydroperoxide may be obtained to the virtual exclusion of the alcohol and ketone secondary reaction products. Such reaction products may be used per se in the process of this invention. The amount of unchanged ethylbenzene remaining in the reaction product then will act as a solvent during the decomposition reaction of the hydroperoxide.

In case it is desirable, however, to obtain the hydroperoxide in a more concentrated form, the hydroperoxide may be separated from the other constituents of the crude reaction mixture. The hydroperoxides may be separated from the reaction mixtures by, for example, fractional distillation at very low pressures, of the order of 0.01 to 1.0 millimeter of mercury, the hydroperoxides having higher boiling points than the related hydrocarbon, alcohol, and ketone. In some instances, the hydroperoxides also may be separated from the oxidation reaction mixtures by crystallization, which may be facilitated by first distilling off at least part of the hydrocarbon. Another method of separating the hydroperoxides from the oxidation reaction mixture involves precipitation of the hydroperoxide with a concentrated aqueous solution (25% to 40%) of sodium hydroxide.

The process of this invention therefore is applicable not only to pure or concentrated hydroperoxides but also to mixtures containing varying amounts of the hydroperoxides, for example, the crude reaction mixtures obtained in the oxidation of the alkyl-substituted aromatic organic compounds previously described. In addition, either the pure or concentrated hydroperoxides or the crude reaction mixtures containing the hydroperoxides may be dissolved in a suitable organic solvent which is inert to any of the reactants, products or reaction conditions involved in the process of this invention. In other words, the solvent should be nonreactive, under the conditions of reaction, to the hydroperoxide, the catalyst, and any of the phenolic or aldehydic reaction products obtained by the decomposition. Exemplary of such solvents are the water-soluble alcohols, ketones and esters, such as methanol, ethanol, propanol, acetone, methyl ethyl ketone, methyl acetate, and ethyl acetate. In addition, various acidic solvents, such as glacial acetic acid, which are inert in the process but which may exert some catalytic activity may be used. The concentration of the solvent and the α-alkylarylmethyl hydroperoxide in the solution to be used during the decomposition reaction may be varied very widely. The concentration of the hydroperoxide is limited only by the reactivity of the hydroperoxide during the decomposition, the effectiveness of the catalyst, and the temperature and pressure used. In other words, the concentration of the hydroperoxide may be selected so that under the desired reaction conditions the conversion takes place at a controllable rate to give a satisfactory amount of conversion product.

In the decomposition process of this invention any water-soluble acid may be used which is capable of decomposing an α-alkylarylmethyl hydroperoxide to a phenol. Both inorganic and organic water-soluble acids in this category may be utilized. Exemplary of the inorganic acids are hydrochloric, sulfuric and phosphoric. The organic acids include the organic sulfonic acids, for example, benzenesulfonic acid and p-toluenesulfonic acid, as well as organic acids such as monochloroacetic acid, dichloroacetic acid, and trichloroacetic acid. The concentration of the water-soluble acid will depend to some extent on the reactivity of the acid, the temperature of reaction, and the desired reaction time, and in order to obtain the desirable phenol yields obtainable by the process of this invention, the concentration of the acid in the aqueous phase must be at least 20% by weight. A preferable range on this basis is from 20% to about 65%. Particularly applicable is a concentration range from 20% to about 50%.

The activity of the water-soluble acid increases with the acid strength of the acid. In general, the greater the acid strength of the acid, the more rapid will be the decomposition reaction. Also, as shown by the examples, the rate of decomposition increases with acid concentration.

It is desirable in carrying out the process of this invention that efficient agitation be utilized in order to bring the hydroperoxide into close contact with the aqueous solution of the water-soluble acid. Such agitation may be obtained through use of mechanical stirrers or by passing a stream of a gas such as air through the reaction mixture.

The temperature which may be used during the decomposition reaction may be varied rather widely depending to a great extent upon the activity of the aqueous acid catalyst. Some of the aqueous acids which are operable in accordance with the process of this invention are not extremely reactive at relatively low temperatures, for example, 20° C. to 50° C. but are quite active at higher temperatures, for example, 100° C. The temperature at which the reaction is carried out therefore will depend upon the particular aqueous acid utilized. Generally speaking, the decomposition reaction may be effected over a temperature range of about 15° C. to about 100° C. It is desirable that the temperature be sufficiently high in order that the decomposition of the hydroperoxide proceeds at a reasonable rate in order to prevent the danger resulting from accumulation of the hydroperoxide in the reaction mixture. For this reason, the minimum temperature of 15° C. is desirable. A preferable temperature range, however, within which the reaction may be carried out is from about 30° C. to about 75° C.

The examples have shown the decomposition reaction as being carried out at atmospheric pressure. The reaction, however, may be effected under reduced pressure, and it is obvious, of course, that the reaction also may be carried out under pressures greater than atmospheric. A broad range of pressure conditions is possible in effecting the decomposition reaction, but from the standpoint of practicality, the reaction preferably is carried out either at atmospheric or slightly less than atmospheric pressure.

It is apparent that the process of this invention has many outstanding advantages over previous processes for the preparation of phenols. To carry out the decomposition reaction it is not necessary to use expensive, complicated equipment and, in addition, the process does not require large installation to provide facilities for the raw materials used. The process also need not be operated on the basis of large production capacity in order to produce phenol at a reasonable price. A further advantage of the process is that it may be combined with the oxidation process for preparation of the hydroperoxide in such a manner that a continuous process may be carried out. One of the over-all processes involved in this invention comprises: the alkylation of benzene with ethylene to obtain ethylbenzene; oxidation of the ethylbenzene to obtain α-methylbenzyl hydroperoxide, decomposition of this hydroperoxide to get phenol and acetaldehyde as products, separation of the phenol and acetaldehyde from the reaction mixture, and recycle of any ethylbenzene remaining after the decomposition step to the oxidation system after first removing from the recycle ethylbenzene any contaminating phenol. The latter should be done since it has been found that the presence of minute amounts of phenol in ethylbenzene will retard the oxidation reaction. Preferably, it is desirable to remove, by distillation, for example, the major portion of unreacted ethylbenzene immediately following the oxidation step.

The process in accordance with this invention represents a more economical and efficient means for obtaining not only phenol itself but also other phenolic compounds such as p-cresol and hydroquinone. The latter two compounds are, of course, obtained by the decomposition of α-methyl-p-methylbenzyl hydroperoxide and α,α'-dimethyl-p-xylylene dihydroperoxide, respectively. Due to the simple nature of the process, the latter will be found particularly applicable to small-scale installations and will not require the vast outlay of capital and equipment required by previous processes.

What I claim and desire to protect by Letters Patent is:

1. The process of producing a phenol which comprises contacting an α-alkylarylmethyl hydroperoxide at a temperature between about 15° C. and about 100° C. with an aqueous water-soluble acid solution containing at least 20% by weight of said acid.

2. The process of producing a phenol and an aliphatic aldehyde which comprises contacting an α-alkylarylmethyl hydroperoxide at a temperature between about 15° C. and about 100° C. with an aqueous water-soluble acid solution containing at least 20% by weight of said acid.

3. The process of producing phenol which comprises contacting α-methylbenzyl hydroperoxide at a temperature between about 15° C. and about 100° C. with an aqueous water-soluble acid solution containing at least 20% by weight of said acid.

4. The process of producing phenol which comprises contacting α-methylbenzyl hydroperoxide at a temperature between about 15° C. and about 100° C. with an aqueous water-soluble acid solution containing at least 20% by weight of said acid, and separating phenol from the reaction mixture.

5. The process of producing p-cresol which comprises contacting α-methyl-p-methylbenzyl hydroperoxide at a temperature between about 15° C. and about 100° C. with an aqueous water-soluble acid solution containing at least 20% by weight of said acid.

6. The process of producing hydroquinone which comprises contacting α,α'-dimethyl-p-xylylene dihydroperoxide at a temperature between about 15° C. and about 100° C. with an aqueous water-soluble acid solution containing at least 20% by weight of said acid.

7. The process of producing phenol which comprises contacting α-methylbenzyl hydroperoxide at a temperature between about 15° C. and about 100° C. with an aqueous sulfuric acid solution containing at least 20% by weight of said acid.

8. The process of producing p-cresol which comprises contacting α-methyl-p-methylbenzyl hydroperoxide at a temperature between about 15° C. and about 100° C. with an aqueous hydrochloric acid solution containing at least 20% by weight of said acid.

9. The process of producing hydroquinone which comprises contacting α,α'-dimethyl-p-xylylene dihydroperoxide at a temperature between about 15° C. and about 100° C. with an aqueous benzenesulfonic acid solution containing at least 20% by weight of said acid.

10. The process of producing phenol and acetaldehyde which comprises contacting α-methylbenzyl hydroperoxide at a temperature of about 30° C. with an aqueous sulfuric acid solution containing 35% by weight of said acid.

11. The process of producing a phenol which comprises contacting an α-alkylarylmethyl hydroperoxide at a temperature between about 15° C. and about 100° C. with an aqueous water-soluble acid solution containing between 20% and 65% by weight of said acid.

12. The process of producing phenol which comprises contacting α-methylbenzyl hydroperoxide at a temperature between about 15° C. and about 100° C. with an aqueous sulfuric acid solution containing between 20% and 65% by weight of said acid.

13. The process of producing a phenol which comprises contacting an α-alkylarylmethyl hydroperoxide at a temperature between about 15° C. and about 100° C. with an aqueous sulfuric acid solution containing between 20% and 65% by weight of said acid.

14. The process of producing a phenol which comprises contacting an α-alkylarylmethyl hydroperoxide at a temperature between about 15° C. and about 100° C. with an aqueous phosphoric acid solution containing between 20% and 65% by weight of said acid.

15. The process of producing a phenol which comprises contacting an α-alkylarylmethyl hydroperoxide at a temperature between about 15° C. and about 100° C. with an aqueous p-toluenesulfonic acid solution containing between 20% and 65% by weight of said acid.

JOSHUA C. CONNER, JR.

References Cited in the file of this patent

FOREIGN PATENTS

| Number | Country | Date |
|---|---|---|
| 629,429 | Great Britain | Sept. 20, 1949 |

OTHER REFERENCES

Berichte der Deutsches Chemisches Gesellschaft, vol. 77B, pages 257–264 (1944) (Hock et al.). (Abstracted in Chemical Abstracts, vol. 39, page 3526.)